(12) United States Patent
Nonaka et al.

(10) Patent No.: US 6,556,785 B2
(45) Date of Patent: Apr. 29, 2003

(54) RANGE FINDER

(75) Inventors: Osamu Nonaka, Sagamihara (JP); Koichi Nakata, Kokubunji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/942,012

(22) Filed: Aug. 29, 2001

(65) Prior Publication Data

US 2002/0025153 A1 Feb. 28, 2002

(30) Foreign Application Priority Data

Aug. 30, 2000 (JP) ........................................ 2000-261536

(51) Int. Cl.$^7$ ............................................... G03B 13/36
(52) U.S. Cl. ........................ 396/80; 396/104; 396/106; 396/109; 396/123; 396/96; 396/91
(58) Field of Search .............................. 396/80, 81, 82, 396/79, 91, 92, 104, 106, 121, 122, 123, 96, 109

(56) References Cited

U.S. PATENT DOCUMENTS 5,293,194 A * 3/1994 Akashi ........................ 396/104

* cited by examiner

Primary Examiner—W. B. Perkey
(74) Attorney, Agent, or Firm—Straub & Pokotylo; John C. Pokotylo

(57) ABSTRACT

In an apparatus comprising a zoom lens and an electric flash, a range finder that determines, on the basis of an output result obtained by means of one method out of an active AF and a passive AF, whether or not to operate the other method, is utilized.

16 Claims, 7 Drawing Sheets

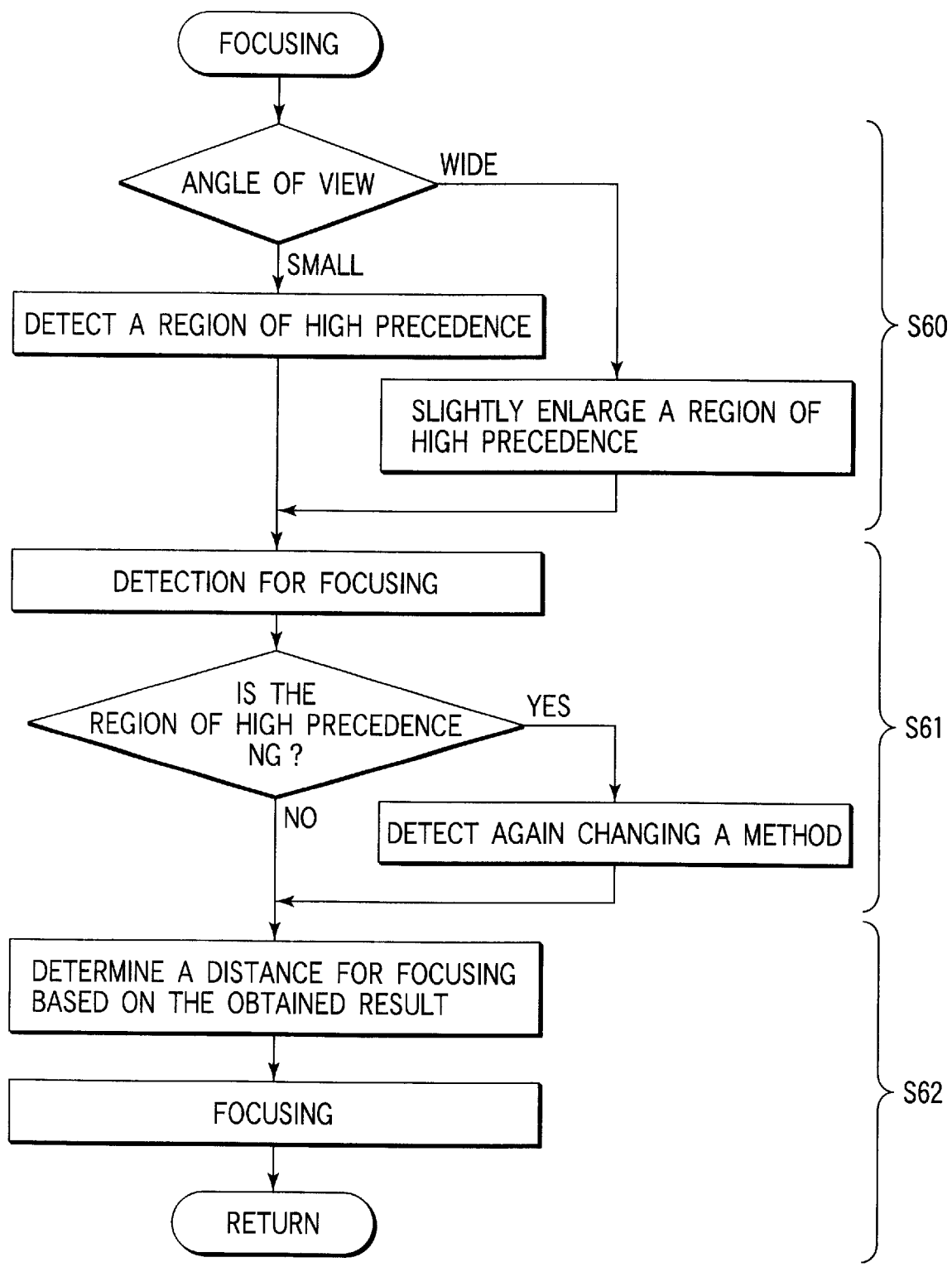
F I G. 1

RANGE FINDER

CROSS-REFERENCE TO RELATED APPLICATIONS

This application is based upon and claims the benefit of priority from the prior Japanese Patent Application No. 2000-261536, filed Aug. 30, 2000, the entire contents of which are incorporated herein by reference.

BACKGROUND OF THE INVENTION

1. Field of the Invention

There have generally been, roughly classified, two methods for an auto focus (AF) apparatus of a conventional camera.

2. Description of the Related Art

One of the methods is called a passive method which is based on an image signal of a subject. The other one is called an active method for focusing on the basis of reflected signal light of light projected from a camera to a subject.

In the passive method, the image signal is used, which makes it difficult to focus in a dark scene. Even in a bright scene, it is not possible to focus on a subject having no contrast, in principle. To deal with this, a technique of switching the aforementioned two methods for use as disclosed in Japan Patent Application KOKAI Publication No. 11-83474.

In general, there are many cases where an important object is located in the center of a finder in a camera. When another object located in an ambient portion in the finder is brought into focus, the important object located in the center cannot be focused on. More specifically, a case has arises in that, in the scene as shown in FIG. 10, when a camera is focused on a beer bottle 101, a face of the person 102, an essential part, becomes blurred.

However, if either of the two methods is used while switching one to the other between the two methods as like in a conventional technique, a problem of misjudgment has not been able to be avoided such that one method, not the selected one, should have been selected, in fact.

BRIEF SUMMARY OF THE INVENTION

In view of the above-depicted status, it is an object of the present invention to provide a range finder which makes it possible to accurately focus on a person in such scenes, and sufficiently considers shutter time lag or energy conservation by combining the two methods.

To achieve the above object, a range finder of the invention is characterized by comprising first focus means for focusing by using an image signal of a subject, light-projection means for projecting light, second focus means for focusing on the basis of reflected signal light of light projected from the light-projection means, and determination means for determining, on the basis of an output result from one of the first or second focus means and a zoom position of a zoom lens, whether or not to operate the other one of the first or second focus means.

The range finder includes a plurality of ranging points having different precedence from each other, is characterized by comprising determination means for determining whether or not to re-range on the basis of reliability in ranging the plurality of points of high precedence.

In addition, the range finder is characterized by comprising switching means for switching the plurality of points of high precedence on the basis of an angle of view in shooting, in that integral time during A/D conversion of an image signal of a subject is switched in performing the re-ranging.

Moreover, the range finder is characterized in that presence/absence of projecting light for range finding during A/D conversion of an image signal of a subject is switched in performing the re-ranging.

According to a range finder having the above-described mechanism, it is possible to provide a range finder which considers energy conservation or shutter time lag, and furthermore, makes it possible to focus accurately without having a weak point in any scenes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a chart showing a flow according to embodiments of the invention;

DETAILED DESCRIPTION OF THE INVENTION

Embodiments of the invention now will be explained referring to the accompanying drawings.

First, a focusing method of the invention will be explained referring to FIG. 1 so as to help to understand embodiments of the invention.

The invention achieves results on the premise of the following concept.

On the basis of a flow shown in FIG. 1, a point of high precedence in a finder is determined in accordance with an angle of view (S60), and it is determined whether or not detection for focusing is to be performed again in a range finding on the basis of focus information of the point of high precedence (S61).

As previously described, for a focus method, there are several methods such as an active AF, passive AF, etc., each having its own characteristics. When it is determined that detection is needed again in the S61, detection is performed again in a method, which is different from one for the first detection for focusing so as to deal with otherwise difficult objects. A distance for focusing is determined based on the obtained result in S62.

For additional example, in a scene such that a person is to be shot with night scenery as a background, the night scenery as a background is sufficiently bright and has a contrast, so that it is apt to determine mistakenly that a passive focus method is preferable. As a result, a person being relatively dark and having a low contract becomes out of focus in many cases. However, according to the invention, it becomes possible to focus accurately by considering the result attained by the two methods, the active AF and the passive AF, after obtaining information on a subject distance by one of the methods.

The invention will be explained in detail referring to the accompanying drawings hereinafter.

Figure 2A:
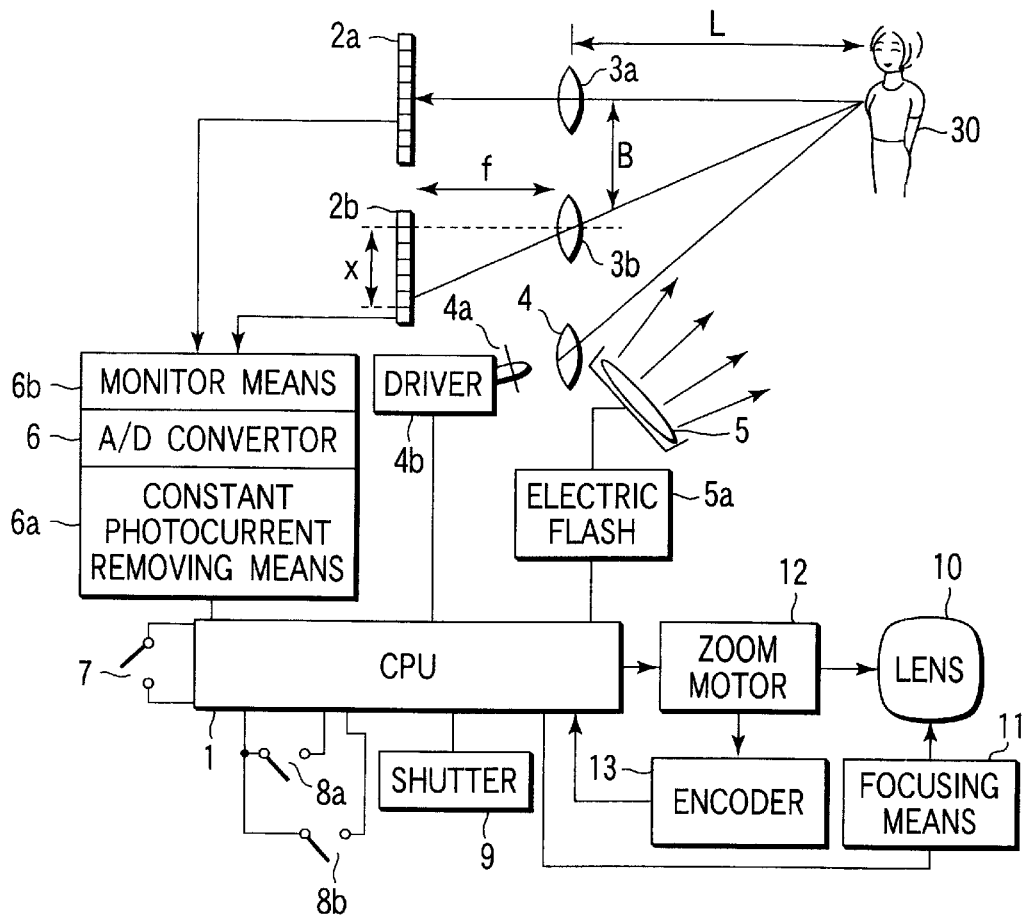
FIGS. 2A and 2B are diagrams showing a state in which a range finder is applied to an auto focus apparatus of a lens-shutter type camera according to a first embodiment of the invention and an outward appearance of the camera, respectively.
Figure 2B:
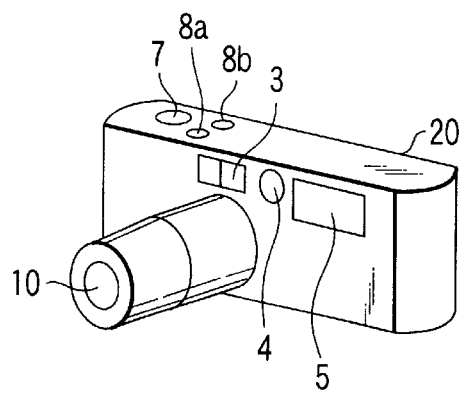
Figure 3:
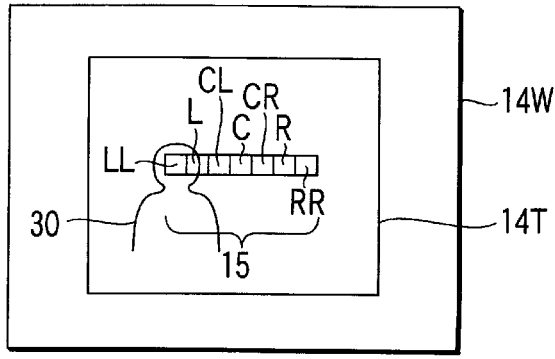
FIG. 3 is a view showing the detail of a sensor array according to the first embodiment of the invention.

A first embodiment in which the invention is applied to an auto focus apparatus of a lens-shutter type camera in FIGS. 2A, 2B and 3.

On the front of a camera 20 shown in FIG. 2B, there are arranged a zoom lens 10, a light-receiving lens 3 for ranging, a light generation means 4 for ranging, and a strobe light generation part 5.

On the top of the camera, a release button 7, and switches 8a and 8b for zooming the zoom lens are arranged. When a user operates these components, an angle of view is changed, or shooting is performed. An electric circuit shown in FIG. 2A controls these operations. A central processing unit (CPU) 1 constituted by one-chip microcomputers or the like detects an input state of the switches 7, 8a, 8b or the like on the basis of a predetermined program stored in a self-contained ROM (read only memory), and controls a zoom motor 12, a shutter 9 or the like. For controlling the zoom motor 12, the CPU detects a rotation of the motor by means of an encoder 13, thereby determining an accurate position. On releasing, a distance is detected on the basis of a light signal incident into sensor arrays 2a and 2b through optical elements for ranging (light-receiving lens) 3a and 3b. On the basis of the result, the lens 10 is focused by means of a focusing means 11 and then exposure control follows. The CPU 1 causes the light generation part 5 to emit light through an electric flash lamp 5a if necessary.

An image of a person (subject) 30 is formed on sensor arrays 2a and 2b through the aforementioned two light-receiving lenses 3a and 3b. Each sensor of the sensor arrays 2a and 2b converts photoelectrically a distribution of light-contrast of the above image forming process into a current signal. When the current is integrated for a predetermined time in each condenser (not shown), a distribution of the output voltage turns into an image signal. The signal is A/D-converted by an A/D converting means 6 into a digital signal, and the resulted digital signal is input into the CPU 1 as an image signal. Assume that the two light-receiving lenses 3a and 3b are arranged at a distance of a base line length B from each other. When a relative positioning difference x of images obtained in the sensor arrays 2a and 2b is found, a subject distance L is calculated based on a relation of $L = B \times (f/x)$. In this embodiment, f represents a focal distance of the light-receiving lens as shown in FIGS. 2A and 2B.

The integral time has been mentioned above. The integral time is to be determined by monitoring a quantity of photocurrent in a predetermined region of the sensor arrays 2a and 2b, so that a monitor means 6b is prepared. Using the monitor means 6b, monitor regions are to be switched, completion of integral is to be determined, and so forth. In order to integrate only photocurrent based on reflected signal light in projecting light for ranging but not to integrate photocurrent output constantly from the sensor arrays 2a and 2b, a constant photocurrent removing means 6a is provided. When the CPU 1 causes an infrared light emitting diode (IRED) 4a to emit light through a driver 4b in ranging, the constant photocurrent removing means 6a is operated. If the constant photocurrent removing means 6a is operated in a normal detection of image signals with no emission of the IRED, photocurrent is removed entirely. As a result, image signals cannot be obtained. For this reason, the means 6a is operated only when the IRED is emitted.

Figure 10:
FIG. 10 is a view showing an example of focusing in a conventional art.

The sensor arrays 2a and 2b are dividable into roughly seven regions. The regions are called LL, L, CL, C, CR, R, and RR as shown in FIG. 3. Each of these regions is constituted by several decades of sensors. For example, when the subject (person) 30 is positioned as shown in FIG. 3, an image signal in the LL region is used. 14T and 14W represent a variation of an angle of view caused by zooming an image pickup lens. 14T and 14W represent a telephoto angle and a wide angle, respectively. In the telephoto angle, regions of LL and RR are positioned at respective edges of the finder, and tend to catch miscellaneous subjects (e.g. a bottle shown in FIG. 10), but not a main subject. Therefore, when the angle of view is small (telephoto angle), it is preferable that the regions CL, C, and CR are adapted for regions of high precedence, and when the angle of view is large (wide angle), it is preferable that the regions L, CL, C, CR and R are adapted for regions of high precedence, for example.

As described in the foregoing, according to the first embodiment of the invention, when the result of ranging, which was obtained by means of the passive method, is determined to be unreliable owing to an insufficient contrast or a shortage of brightness in a case where many important subjects exist in the regions of the finder, a ranging operation is to be performed again (re-ranging) by switching to the active ranging method (which involves light-projection for ranging). As a result, an accurate ranging operation can be performed even for a scene in which it has generally been difficult to range. Hence, it becomes possible to shoot important subjects without them being out-of-focus. In addition, it becomes possible to focus accurately while preventing wasted energy or time that would occur if every ranging operation were performed by means of both passive and active methods.

Next, a second embodiment of the invention will be explained referring to FIGS. 4A to 4D and 5.

Figure 4A:
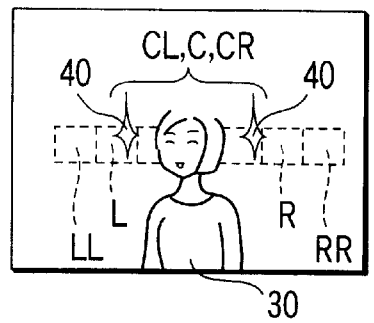
FIGS. 4A to 4D are views showing finders and graphs showing output distributions according to the first embodiment of the invention.
Figure 4C:
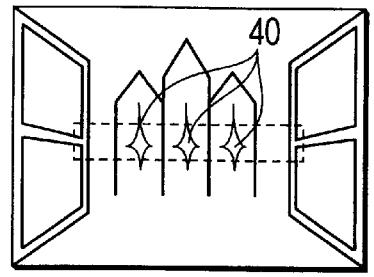
Figure 4B:
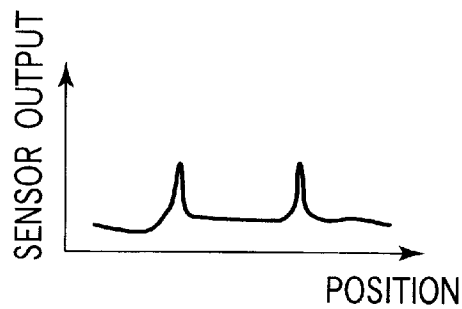
Figure 4D:
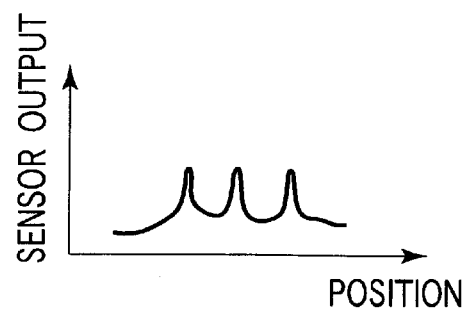

FIG. 4A shows a scene with a background of night scenery. In such a scene, it is assumed that a strong light source 40 exists sidewise behind the person 30. When a distribution of output from the respective sensors is plotted as shown in FIG. 4B, image signals of the person are disappeared owing to a contrast of background light. Similarly to that, when night scenery outside windows is shot as shown in FIG. 4C, a distribution of the obtained light is represented as shown in FIG. 4D owing to the strong light source 40. Therefore, in the scene as shown in FIG. 4A, it is necessary to range accurately so as to focus on the person as much as possible, even if auxiliary light is need to project. However, in the scene as shown in FIG. 4C, even if auxiliary light is projected, only window frames are ranged. In this case, it is intended to shoot the scenery, so that the auxiliary light is projected in vain from viewpoints of time and energy.

For this reason, as shown in FIGS. 4A to 4D, the auxiliary light is not projected unless contrasts of points CL, C and CR in the finder becomes low. In addition, it is effective if ranges CL, C and CR for determination of a low contrast are switched depending on an angle of view in shooting.

Figure 5:
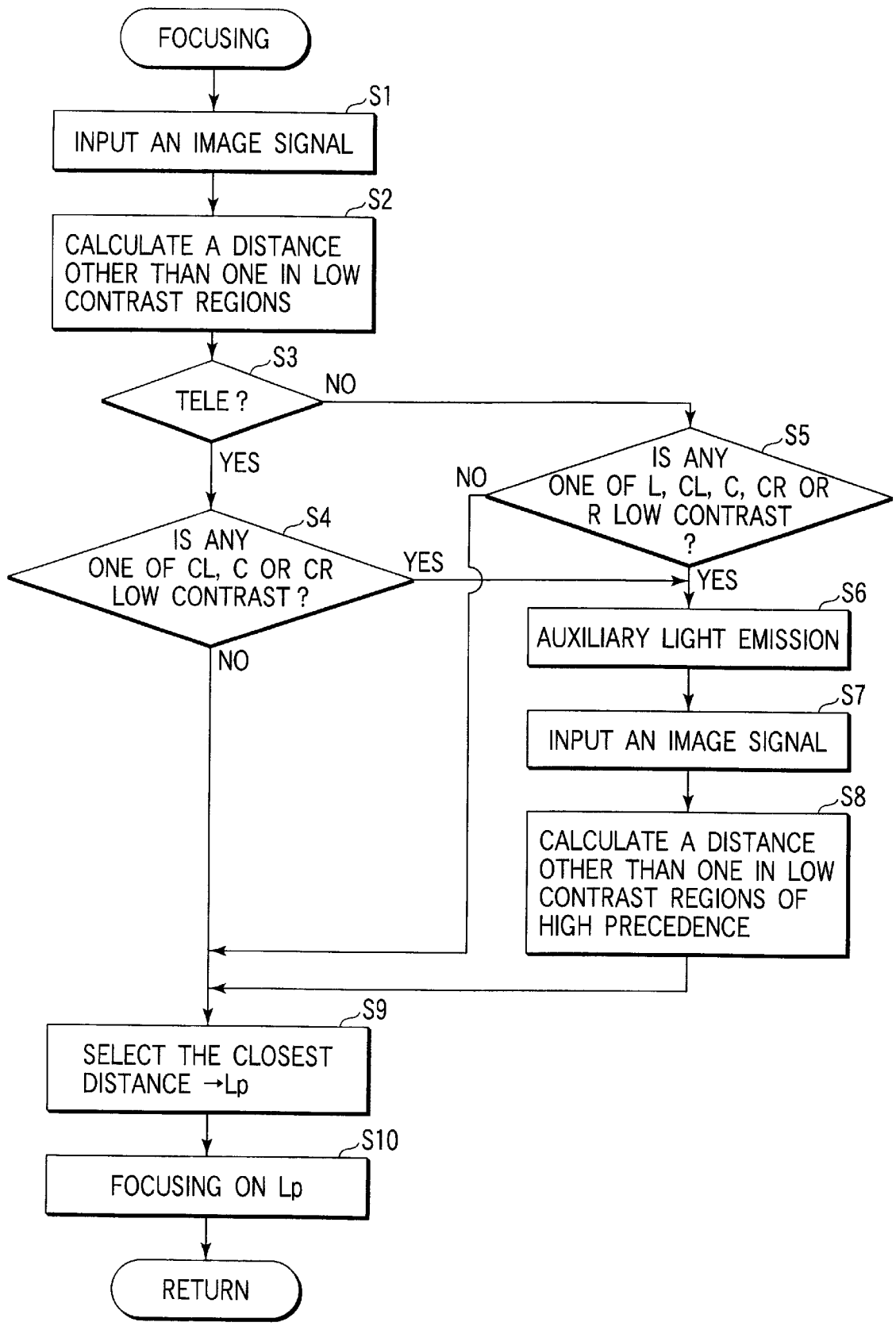
FIG. 5 is a chart showing a flow according to a second embodiment of the invention.

A flow for focusing is shown in FIG. 5. In S1, sensor array image signals are input, and then a distance other than one in the low contrast portion is calculated on the basis of the obtained image signals in S2. At this time, using image signals in the respective regions LL, L, CL, C, CR, R and RR, a distance of the subject, existing in each region, is calculated. S3 is a step in which an angle of view is determined. When an angle of view is a telephoto (Tele) one, the flow diverges to S4 so as to perform low contrast determination with CL, C, and CR as to be low contrast determination regions, as described above. When an angle of view is a wide one, the flow diverges from S3 to S5 so as to increase low contrast determination regions. As a result, when the determination regions are low contrast ones (it is impossible to range owing to a low contrast), auxiliary light (strobe light) is emitted in S6. Image signals in irradiating the auxiliary light are input in S7, and then the light regions having precedence is ranged again (S8). When a focusing operation is performed (S9 and S10) with the closest distance selected from the distances obtained in S2 and S8 as to be a focus distance $L_p$, an image of the person shown in FIG. 4A can be obtained with the help of auxiliary light. In addition, the flow does not pass through S6 with respect to FIG. 4C and thus, it becomes possible to range accurately and focus in both of the cases.

Figure 6:
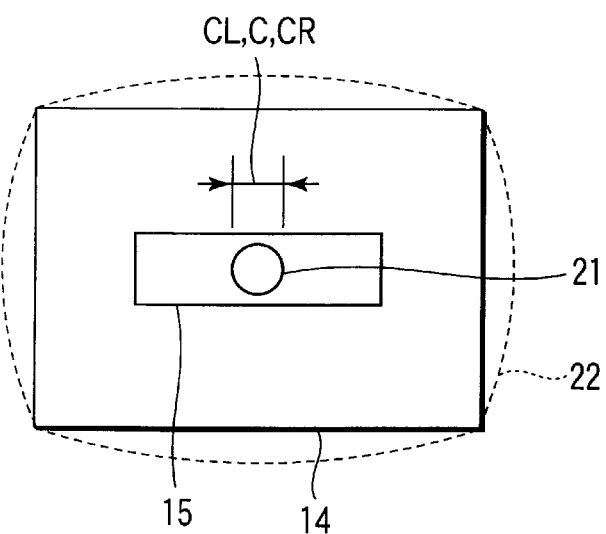
FIG. 6 is a view showing a finder according to a third embodiment of the invention.

Next, a third embodiment of the invention will be explained referring to FIGS. 6 and 7. In this embodiment, the passive AF is carried out first and then the active AF involving light-projection is performed in a re-ranging operation.

Two sorts of light are adapted to further increase focusing accuracy. The two sorts of light are constituted by strobe light capable of projecting strong light to a region 22, which is equivalent to the entire region of a finder 14 in FIG. 6, and light of the IRED having a contrast and being capable of projecting light to only a region 21, which is limited in a ranging region 15. In this embodiment, the region having precedence on low contrast determination is set only to C in the telephoto angle of view, and to CL, C and CR in the wide angle of view. Therefore, the first half of a flow in FIG. 7, i.e., from S20 to S24, is substantially the same as one in FIG. 5, i.e., from S1 to S5, which are steps for attempting the first ranging. However, the steps for determining whether or not there is low contrast are different. That is, light of the IRED, which is not dazzling, is emitted in S25 so that less energy is necessary in comparison with one for using strobe light. The image signals obtained through the previous step are input (S26), and then a distance other than one in the low contrast region is calculated (S27). However, the light of the IRED is not as strong as one of the strobe light, so that a ranging operation to a distant object cannot be performed. Thus, the low contrast determination is performed again depending on the angle of view. When there is a low contrast region in the region having precedence, the strobe light is emitted (S31) similarly to step S25. After that, the image signals are input (S32), and a ranging operation is performed by means of the strobe light in S33 (similar to S26 and S27). From the distances obtained in the steps (S21, S27 and S33), the closest distance is selected as to be the focus distance $L_p$ (S34), thereby focusing based on the distance $L_p$ (S35).

Through the flow of this sort, the ranging operation is carried out by projecting light of the IRED which is not dazzling, needs less consumption energy and is capable of projecting spotlight having a contrast, not depending as much as possible on the strobe light (auxiliary light), which is dazzling and requires a plenty of energy consumption. Thus, the ranging operation is achieved without giving dazzling light to a subject at a short range. Furthermore, it is not necessary to perform a vain re-ranging operation as much as possible by switching the determination depending on an image. Hence, it is possible to provide a camera having a finer and quality range finder capable of ranging a subject in the distance, which is difficult for the conventional active AF to range owing to a great distance, by using the strong light.

Next, a fourth embodiment of the invention will be explained referring to FIGS. 8A to 8C and 9. In the previous embodiment, the passive AF is performed first, and then the active AF involving light-projection is carried out in re-ranging. In this embodiment, the active AF is performed first. Furthermore, there are many scenes, which can be optimized by, e.g., switching an integration time in the passive AF operation. Hence, it becomes possible to achieve a range finding and a focusing without having still less weak points in scenes by combining a technique of switching the integration time in a repeated integration (S51) shown in FIG. 9.

Figure 8A:
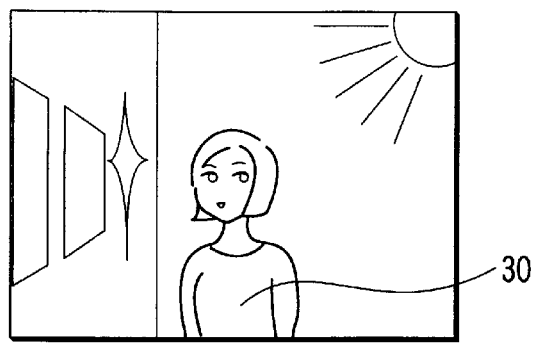
FIGS. 8A to 8C are a view and diagrams showing a subject, in a case where a contrast of background light is strong, according to a fourth embodiment of the invention.
Figure 8B:
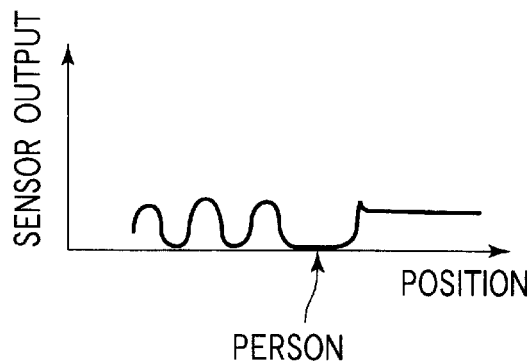
Figure 9:
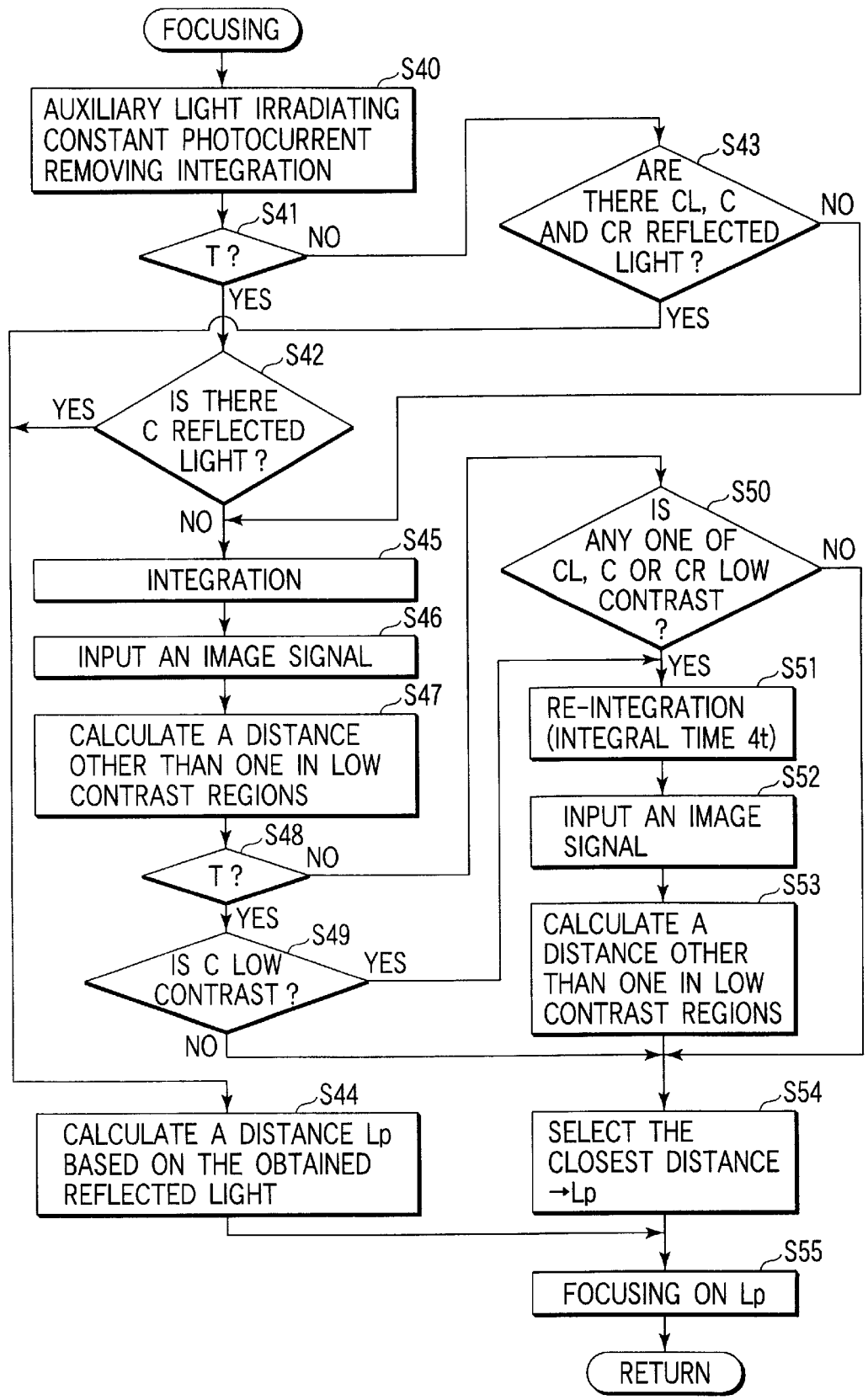
FIG. 9 is a chart showing a flow according to the fourth embodiment of the invention.

For example, in a scene shown in FIG. 8A where the sunshine is strong in the daytime and the reflected sunshine from the background is also strong, the obtainable sensor data is plotted as shown in FIG. 8B. Similar to the case of the night scene, an image signal of sharp contrast cannot be obtained from regions of the person 30. For this reason, the active AF of the previous embodiment is simply performed. However, when light from the background is excessively strong, it exceeds a dynamic range of the constant photo-current removing means (circuit). Consequently, it is impossible to carry out the active AF accurately. To solve this, in the present embodiment, as shown in FIG. 9, the active method AF of auxiliary light (strobe light) irradiating-constant photocurrent removing integration is performed in S40 first, and then whether or not a telephoto (Tele) one is determined in S41. Assume that the AF of the active method cannot be performed satisfactorily. At this time, when no contrast is determined in regions of high precedence (no reflected signal light) in spite of proceeding to either S42 or S43 (regardless of the telephoto angle or not), the flow diverges to S45. Then, image signals are input in S46, and a distance other than one in the low contrast regions is measured in S47, thereby performing the passive AF. At this time, in the state shown in FIG. 8B (The sunshine is strong in the daytime and thus the reflected sunshine from the background is also strong.), as a contrast of the background light is strong, which is obvious by referring to sensor output in FIG. 8B, an image signal of the person cannot attain a sufficient contrast. Therefore, when a center region in the finder is assumed to be a finding region of high precedence, C is considered to be low in contrast in S49. In S50, any one of CL, C or CR is considered to be low in contrast, and thus the flow diverges to S51. When any one of CL, C or CR is not considered to be low in contrast, the flow proceeds to S54. Then, the closest distance among S44, S47 and S53 is considered to be the focus distance $L_p$, thereby focusing base on the distance $L_p$ (S55).

Figure 8C:
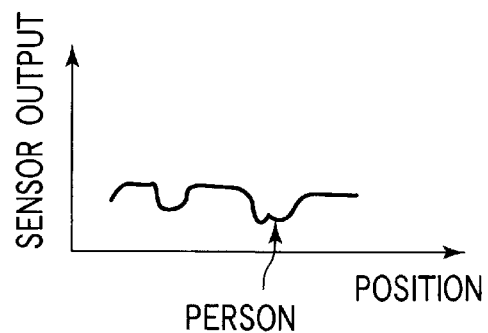

In S51, the sensor out is re-integrated. At this time, even if the background light is saturated, the integrating time is extended, for example, four times as long as one in S45 so as to detect an image of the person at the center, thereby obtaining the sensor output as shown in FIG. 8C. This can obtain the image of person's region. As a result, as a distance is calculated on the basis of the image signals, it becomes possible to focus accurately even in a scene against the light in the daytime as shown in FIG. 8A.

Figure 7:
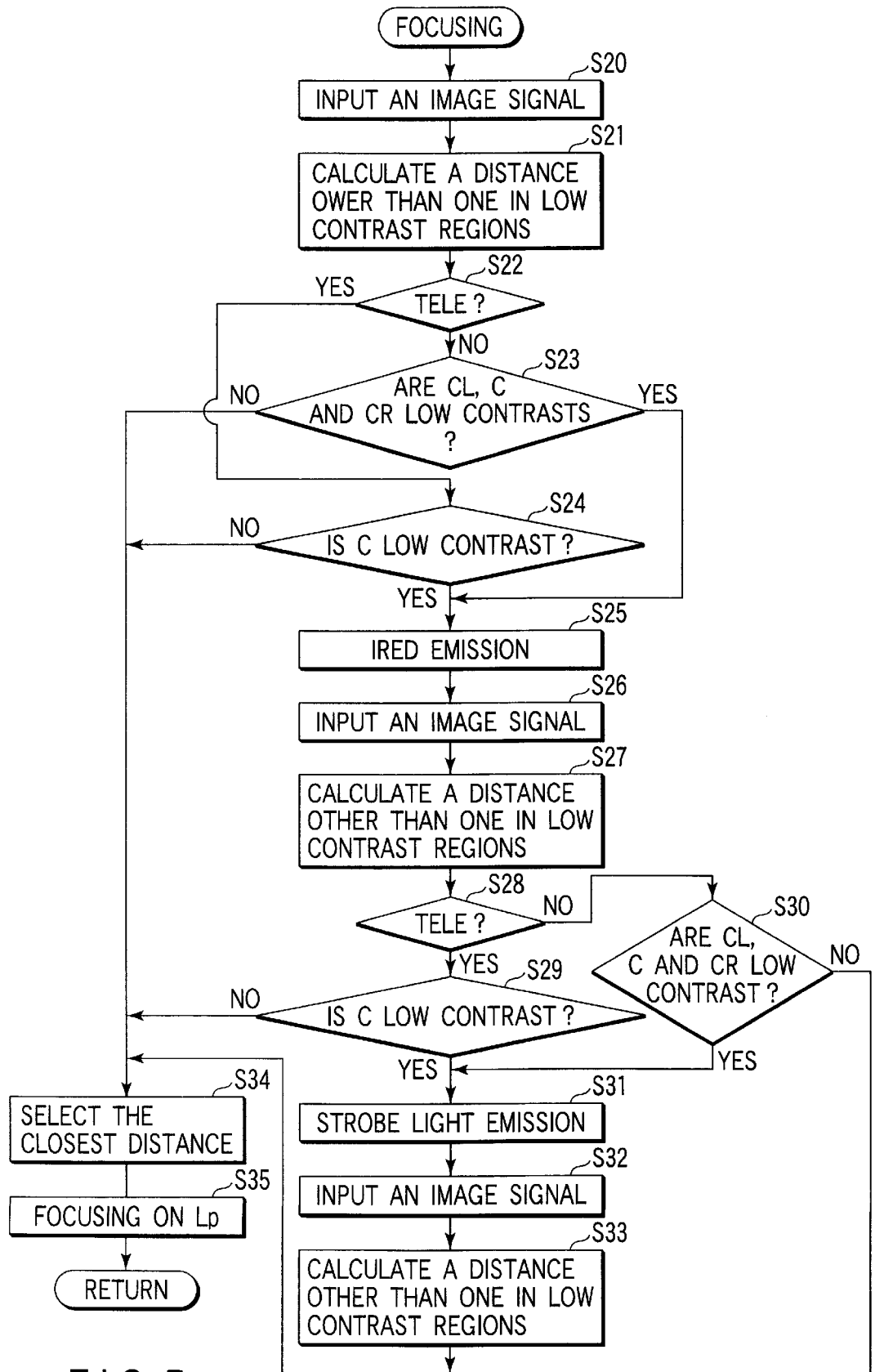
FIG. 7 is a chart showing a flow according to the third embodiment of the invention.

In the present embodiment, similarly to FIG. 7, a ranging operation is performed three times for the worst and the time required for ranging tends to be longer for a scene hard to deal with. However, regions of high precedence are limited considering an angle of view so as to be determined. Thus, it prevents as much as possible that energy or time is wasted owing to increase of unnecessary ranging.

In an ordinary shooting scene, a subject exists within a distance to which the active AF is effective. Furthermore, the subject exists at the center in the finder in many cases. Thus, about 80% of taking photographs of scenes is carried out with the flow of steps from S40 to S44. However, when the scenes or their background are excessively bright, the flow diverges to S45 and a re-ranging is performed by switching the ranging method to a different one. Hence, it becomes possible to focus accurately on the remaining about 20% of scenes.

Subjunction 1

A camera including a range finder comprising:
a zoom lens;
first focus means for focusing by using an image signal of a subject;
light-projection means for projecting light;
second focus means for focusing on the basis of reflected signal light of light projected from the light-projecting means of; and
determination means for determining, on the basis of an output result from one of the first or second focus means and a zoom position of the zoom lens, whether or not to operate the other one of the first or second focus means.

Subjunction 2

A camera having a range finder including a plurality of ranging points having different precedence from each other, comprising determination means for determining whether or not to re-range on the basis of reliability in ranging the plurality of points of high precedence.

Subjunction 3

A camera having a range finder according to subjunction 2, comprising switching means for switching the plurality of points of high precedence on the basis of an angle of view in shooting.

Subjunctuion 4

A camera having a range finder according to subjunction 2 or subjunction 3, wherein integral time for switching integral time during A/D conversion of an image signal of a subject is switched in performing the re-ranging.

Subjunctuion 5

A camera having a range finder according to subjunction 2 or subjunction 3, wherein presence/absence of projecting light for range finding during A/D conversion of an image signal of a subject is switched in performing the re-ranging.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A range finder, comprising:
   first focus means for focusing by using an image signal of a subject;
   light-projection means for projecting light;
   second focus means for focusing on the basis of reflected signal light of light projected from the light-projection means; and
   determination means for determining, on the basis of an output result from one of the first or second focus means and a zoom position of a zoom lens, whether or not to operate the other one of the first or second focus means.

2. A range finder including a plurality of ranging points having different precedence from each other, the range finder comprising:
   determination means for determining whether or not to re-range on the basis of reliability in ranging the plurality of points of high precedence; and
   switching means for switching the plurality of points of high precedence on the basis of an angle of view in shooting.

3. A range finder, comprising:
   a first focus module for focusing by using an image signal of a subject;
   a light-projection module for projecting light;
   a second focus module for focusing on the basis of reflected signal light of light projected from the light-projection means; and
   a determination module for determining, on the basis of an output result from one of the first or second focus modules and a zoom position of a zoom lens, whether or not to operate the other one of the first or second focus modules.

4. A range finder including a plurality of ranging points having different precedence from each other, the range finder comprising:
   a module of determining reliability for determining reliability in ranging the plurality of points of high precedence;
   determination means for determining whether or not to re-range on the basis of a result from the module of determining reliability; and
   a switching module for switching the points of high precedence on the basis of an angle of view in shooting.

5. A camera including a plurality of ranging points having different precedence from each other, comprising:
   a range finder including a determination module for determining whether or not to re-range on the basis of reliability in ranging the plurality of points of high precedence; and
   a module of switching integral time for switching integral time during A/D conversion of an image signal of a subject in performing the re-ranging.

6. A camera including a plurality of ranging points having different precedence from each other, comprising:
- a range finder including a determination module for determining whether or not to re-range on the basis of reliability in ranging the plurality of points of high precedence; and
- a module of switching light-projection for switching presence/absence of light projection for ranging during integrating an image signal of a subject in performing the re-ranging.

7. A camera, comprising:
- a plurality of light receiving sensors corresponding to a plurality of ranging points in a view field;
- a module of calculating subject distance for calculating a subject distance in accordance with output of light receiving sensors having no low contrasts among output of the plurality of light receiving sensors;
- a module of setting light receiving sensors for setting a predetermined plurality of light receiving sensors among the plurality of light receiving sensors;
- a determination module for determining whether or not low presence/absence of contrast output in each output of a plurality of light receiving sensors set by means of the module of setting light receiving sensors; and
- a control module for controlling execution of a re-ranging operation by using light receiving sensors set by means of the module of setting light receiving sensors, in a case of low contrast output being determined to exist by means of the determination module.

8. The camera according to claim 7, further comprising a lens capable of changing a focal distance, wherein
- the module of setting light receiving sensors changes the number of light receiving sensors to be set in accordance with a focal distance of the lens.

9. The camera according to claim 8, wherein the number of light receiving sensors to be changed increases, as a focal distance of the lens decreases.

10. The camera according to claim 8, wherein light receiving sensors of ambient regions of a view field are selected in comparison with a case of the focal distance being large, as a focal distance of the lens increases.

11. A camera, comprising:
- a plurality of light receiving sensors corresponding to a plurality of ranging points in a view field;
- a first light projector;
- a second light projector having larger light quantity than one of the first light projector;
- a module of calculating subject distance for calculating a subject distance in accordance with output of light receiving sensors having no low contrasts among output of the plurality of light receiving sensors;
- a module of setting light receiving sensors for setting a predetermined plurality of light receiving sensors among the plurality of light receiving sensors;
- a determination module for determining whether or not presence/absence of low contrast output in each output of a plurality of light receiving sensors set by means of the module of setting light receiving sensors; and
- a control module for controlling execution of a re-ranging operation by using light receiving sensors set by means of the module of setting light receiving sensors, after irradiating light by means of the first light projector, in a case of low contrast output being determined to exist by means of the determination module, and controlling to execute a re-ranging operation by using light receiving sensors set by means of the module of setting light receiving sensors, after irradiating light by means of the second light projector, in a case of low contrast output being output again.

12. The camera according to claim 11, further comprising a lens capable of changing a focal distance, wherein
- the module of setting light receiving sensors changes the number of light receiving sensors to be set in accordance with a focal distance of the lens.

13. The camera according to claim 12, wherein the number of light receiving sensors to be changed increases, as a focal distance of the lens decreases.

14. The camera according to claim 12, wherein light receiving sensors of ambient regions of a view field are selected in comparison with a case of the focal distance being large, as a focal distance of the lens increases.

15. The camera according to claim 11, wherein the first light projector is a LED and the second light projector is an electric flash.

16. A camera comprising:
- a lens;
- an electric flash lamp;
- a plurality of light receiving sensors provided for a plurality of distance-measuring points existing in a view field, respectively;
- a module for setting at least one of the light receiving sensors in accordance with a focal distance of the lens;
- a determination module for determining whether said at least one of the light receiving sensors has generated a low-contrast output; and
- a control module for causing the electric flash lamp to emit light to measure a distance between the camera and an object when the determination module determines that said at least one of the light receiving sensors has generated a low-contrast output.

* * * * *